Jan. 15, 1963 R. MANSBACK 3,073,618
GOLF CART SUSPENSION
Filed Dec. 14, 1960
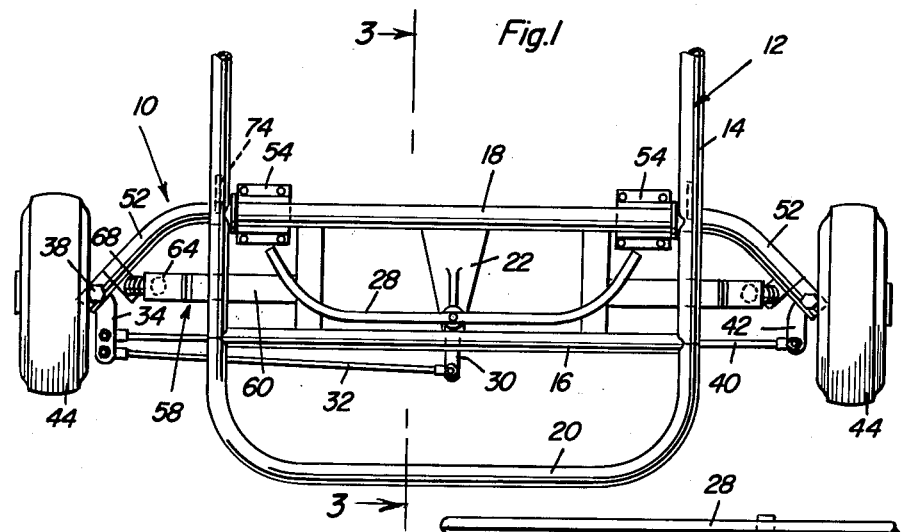
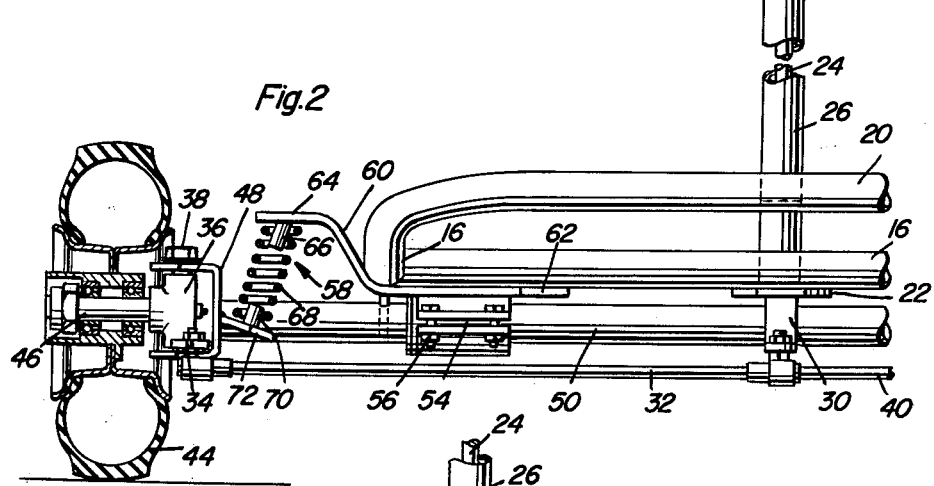
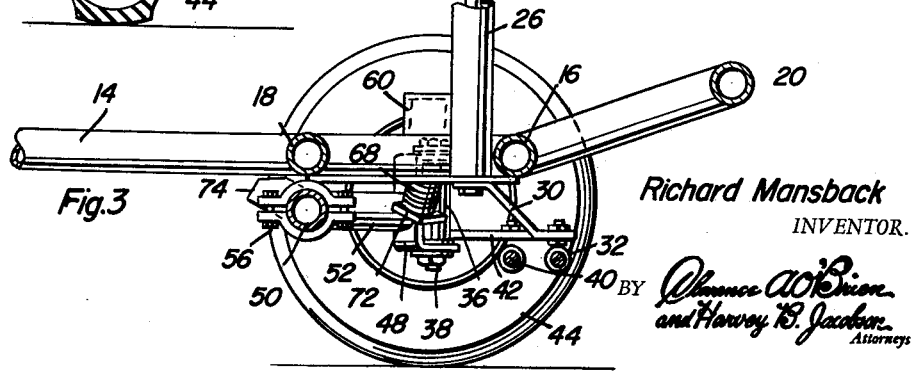
Richard Mansback
INVENTOR.

United States Patent Office 3,073,618
Patented Jan. 15, 1963

3,073,618
GOLF CART SUSPENSION
Richard Mansback, Phillipsburg, N.J., assignor, by mesne assignments, to Go-Far Corporation, Phoenixville, Pa., a corporation of Pennsylvania
Filed Dec. 14, 1960, Ser. No. 75,815
4 Claims. (Cl. 280—96.2)

The present invention generally relates to a suspension system for the front steerable wheels of a vehicle and more particularly to such a suspension for a golf cart.

In recent years, there has been considerable development in golf carts which may be either battery powered or powered by a small gasoline engine whereby golfers may ride along the golf course while taking their shots thus eliminating fatigue and enabling the game to be played with less physical exertion. Quite often, physical exertion such as occurs when playing golf is detrimental to the health of the individuals involved. In such golf carts, there usually is provided a simplified steering system and also a simplified driving arrangement inasmuch as the speeds attained are quite small and most of the driving is over grassy golf courses. Therefore, it is the primary object of the present invention to provide a simplified but yet rugged and long lasting golf cart suspension system for the front steerable wheels which involves a novel manner of suspending the front wheels from the vehicle frame and also a novel means for spring supporting the frame from the wheels and also controlling the position of the wheels.

Another object of the present invention is to provide a golf cart suspension which is simple in construction, long lasting, easy to install and repair, easy to maintain in working order and quite inexpensive to manufacture.

Still a further important object of the present invention is to provide a suspension for golf carts which is foolproof, long lasting and still provides a relatively smooth and comfortable ride to the persons using the cart.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a golf cart frame illustrating the suspension of the present invention incorporated therein;

FIGURE 2 is a detailed front elevational view of the invention with the wheel illustrated in section; and FIGURE 3 is a transverse, sectional view taken substantially upon a plane passing along section line 3—3 of FIGURE 1 illustrating further structural details of the golf cart suspension of the present invention.

Referring now specifically to the drawings, the numeral 10 generally designates the suspension system of the present invention for use in conjunction with a conventional golf cart including a frame generally designated by numeral 12 and including parallel side rails 14 which are rigidly interconnected by a forward transverse member 16 and a rear transverse member 18. Extending forwardly from the front transverse member 16 is a generally U-shaped bumper member 20 which, as shown in FIGURE 1, is integral with and extends upwardly on an incline with the legs thereof generally forming continuations of the rails 14.

Extending forwardly from the center of the rear rail 18 is a bracket 22 which rotatably supports a vertical steering rod 24 that is journaled in a guide sleeve 26 also rigid with the bracket 22. The upper end of the rod 24 is provided with a transversely extending handle 28 generally in the form of a handle bar for enabling rotation of the steering rod 24 about its longitudinal axis. The lower end of the steering rod 24 is provided with an offset arm 30 which may be considered a steering arm connected to an elongated drag link 32. The drag link 32 is connected to an offset arm 34 on one of the spindle assemblies 36 that is rotatably supported on a kingpin 38. The offset arm 34 is also connected with an elongated tie rod 40 which extends to the opposite front wheel and is connected with an offset arm 42 connected with the spindle assembly 36 for the other front wheel. Both of the front wheels pivot about kingpins 38 in an obvious manner and each front wheel is designated by reference numeral 44 and includes the usual bearing assembly 46 which may be lubricated in any suitable manner for rotatably supporting the wheel 44 on the spindle assembly 36 whereby pivotal movement of the spindle assembly 36 and the front wheel 44 about the vertical axis or generally vertical axis of the kingpin 38 will enable steering control of the vehicle as the handlebar 28 is pivoted about the axis of the rod 24.

The kingpins 38 are supported by U-shaped brackets or end members 38 on an elongated front axle 50 which has forwardly or rearwardly extending and outwardly inclined end portions 52 to which the U-shaped end members 48 are rigidly attached. Thus, the spindle assemblies 36 are supported by the U-shaped end members 48 which are rigid with the axle 50 which together with the end portions 52 may be considered substantially a U-shaped axle extending below the frame 12 and being secured thereto for swiveling movement by a split bracket assembly 54 in which the two components of the split bracket assembly 54 are retained by securing bolts 56 thus enabling swinging movement of the axle about a transverse axis so that the wheels and frame may vary as to their elevational relationship as permitted by a spring supporting assembly generally designated by the numeral 58.

The spring support assembly is the same on each side of the frame 12 and includes a laterally extending bracket member 60 which is rigidly secured to the side rail and also having the end affixed to a longitudinal strap 62 extending between the transverse rails 16 and 18. The outer end of the bracket 60 extends upwardly and terminates in a horizontal end portion 64 having a depending inclined rod 66 in the form of a stud or guide which extends into the interior of a coil compression spring 68. The other end of the spring 68 is received on a similar upwardly extending rod or stud 70 that is rigid with a mounting plate or lug 72 rigidly affixed to the forwardly extending portion 52 of the axle 18 thus resiliently urging the forward ends of the axle downwardly away from the frame 12. Thus, the spring 68 actually serves to support the weight of the frame and anything carried thereby such as the body of the golf cart and the occupants from the axle and wheel assembly.

Inasmuch as the axle 50 is of rigid construction, the two front wheels 44 will move in unison with each other with the axle 50 serving as substantially a torsion bar which is capable of very little twisting so that the wheels 44 will actually stay substantially in the same relative position in relation to the frame 12 during their arcuate swinging movement about the axis defined by the axle 50 where it extends through the brackets 54. The brackets 54 may be provided with any suitable bushing and the various components of the steering linkage may be provided with suitable lubrication facilities.

The particular axle assembly provides a simplified arrangement for supporting the front steerable wheels and provides a simplified arrangement for the spring supporting assembly. For preventing the front wheels from pivoting downwardly away from the frame too far such as may occur if the frame is lifted, a stop lug 74 is rigidly attached on the axle 50 adjacent and underlying each of the frame side rails 14, see FIGURE 3, for engagement thereby thus preventing the studs 66 and 70 from becoming disengaged from the spring 68 and maintaining the spring 68 under compression to at least a slight degree when the stop lug 74 is in engagement with the rails.

While pivotal movement of the axle about a transverse axis will enable arcuate swinging movement of the wheels, the change in the angle of inclination of the kingpin will be relatively slight and due to the relatively low speeds and the fact that the cart normally travels over grassy areas, the alternation of inclination of the kingpin would not adversely effect the steering characteristics of the cart nor would it cause excessive tire wear. This arrangement provides a simple and rigid structure which is long lasting and quite dependable and maintains the golf cart in a stable condition even though it may be loaded more heavily on one side than on the other.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A golf cart suspension comprising a frame, a transverse axle mounted on and beneath said frame for rotational movement about a transverse horizontal axis, each end of the axle having a forwardly and outwardly extending end portion, a spindle assembly supported from each end of the axle for movement with said axle and for pivotal movement about substantially a vertical axis, steering control means attached to the frame and to the spindle assemblies for pivoting the spindle assemblies, and a pair of spring means each interconnecting the frame and one of the forwardly extending end portions of the axle in longitudinally spaced relation to the transverse axis of rotation of the axle thereby forming a spring suspension for the frame, stop means on said axle and engaging said frame for limiting swinging movement of said forwardly extending portions, each spindle assemble including a front ground engaging wheel thereby enabling steering control of the frame.

2. The structure as defined in claim 1, wherein said steering control means includes a steering arm, handlebar means connected to the arm and supported on the frame for pivoting the arm about a generally vertical axis, a drag link connected to the arm and connected to one of the spindle assemblies in offset relation to the vertical pivotal axis thereof, and a connecting tie rod extending between the spindle assemblies for pivoting both spindle assemblies in unison.

3. The structure as defined in claim 1, wherein said frame includes a pair of side rails with transversely extending rails connected between said side rails, said means supporting the axle includes a pair of split brackets supported below the side rails and rotatably supporting the transverse axle therein.

4. A golf cart suspension comprising a frame, a transverse axle mounted on said frame for rotational movement about a transverse horizontal axis, each end of the axle having a forwardly extending end portion, a spindle assembly supported from each end of the axle for pivotal movement about substantially a vertical axis, steering control means attached to the frame and to the spindle assemblies for pivoting the spindle assemblies, and spring means interconnecting the frame and the forwardly extending end portions of the axle in longitudinally spaced relation to the transverse axis of rotation of the axle thereby forming a spring suspension for the frame, each spindle assembly including a front ground engaging wheel thereby enabling steering control of the frame, said spring means including a laterally extending bracket at each side of the frame, an inwardly extending bracket on each forwardly extending end portion of the axle underlying and in alignment with the bracket on the frame, a compression coil spring extending between the brackets on the frame and axle, and means on each bracket extending interiorly of the spring for retaining the spring in position, and means on said axle for engagement with the frame for limiting the swinging movement of the forwardly extending end portion thereof in one direction thereby assuring that the springs will be retained in position.

References Cited in the file of this patent

UNITED STATES PATENTS

| | | |
|---|---|---|
| 1,079,249 | Lines | Nov. 18, 1913 |
| 1,987,791 | Opolo | Jan. 15, 1935 |
| 2,418,744 | Ballamy et al. | Apr. 8, 1947 |
| 2,461,775 | Roos | Feb. 15, 1949 |
| 2,606,021 | Hexel | Aug. 5, 1952 |
| 2,701,727 | Linn | Feb. 8, 1955 |
| 2,988,374 | Boyles | June 13, 1961 |